(12) United States Patent
Fischer et al.

(10) Patent No.: US 7,396,417 B2
(45) Date of Patent: Jul. 8, 2008

(54) METHOD FOR REMOVING LASER SCALES

(75) Inventors: Peter Fischer, Oberehrendingen (CH); Hanspeter Brunner, Baden (CH)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 11/662,846

(22) PCT Filed: Sep. 20, 2005

(86) PCT No.: PCT/EP2005/010117

§ 371 (c)(1),
(2), (4) Date: Jul. 3, 2007

(87) PCT Pub. No.: WO2006/039983

PCT Pub. Date: Apr. 20, 2006

(65) Prior Publication Data

US 2008/0011323 A1    Jan. 17, 2008

(30) Foreign Application Priority Data

Sep. 25, 2004  (DE) .................... 10 2004 046 737

(51) Int. Cl.
*C23G 1/00* (2006.01)
(52) U.S. Cl. ................ 134/3; 134/26; 134/28; 134/34; 134/36; 134/40; 134/41; 134/42; 510/245; 510/253; 510/258; 510/365; 510/478; 510/488

(58) Field of Classification Search ............ 134/3, 134/26, 28, 34, 36, 40, 41, 42; 510/245, 510/253, 258, 365, 478, 488
See application file for complete search history.

(56) References Cited

U.S. PATENT DOCUMENTS

| 5,653,917 | A | 8/1997 | Singerman et al. |
| 5,909,742 | A | 6/1999 | Ouyang et al. |
| 6,887,597 | B1 * | 5/2005 | Yang et al. ................ 429/12 |
| 2002/0189632 | A1 | 12/2002 | Glock et al. |
| 2005/0224092 | A1 * | 10/2005 | Schildmann ............. 134/1 |
| 2008/0011323 | A1 * | 1/2008 | Fischer et al. ............ 134/3 |

FOREIGN PATENT DOCUMENTS

| EP | 0 104 012 A | 3/1984 |
| FR | 1 506 468 A | 12/1967 |

* cited by examiner

*Primary Examiner*—Sharidan Carrillo
(74) *Attorney, Agent, or Firm*—Fulbright & Jaworski L.L.P.

(57) ABSTRACT

A degreasing method for descaling or removing laser scales from iron-containing metal part surface by treating the iron-containing metal part surfaces that is optionally tainted with laser scales with an aqueous solution containing at least one type of highly water-soluble and complexed with Fe ions carboxylic acid, at least one type of salt of at least one type of carboxylic acid exhibiting the same action and at least one type of fatty amine ethoxylate, wherein the solution is buffered, the Fe ions are carried into the solution and at least partially complexed, increasing the pH value of the solution for descaling with respect to at least one type of carboxylic acid. The entire concentration of carboxylic acids and the salts thereof is increased for descaling by 2 to 20% by weight.

9 Claims, No Drawings

METHOD FOR REMOVING LASER SCALES

This is a §371 of PCT/EP2005/010117 filed Sep. 20, 2005, which claims priority from German Patent Application No. 10-2004 046 737.4 filed Sep. 25, 2004.

BACKGROUND AND SUMMARY OF THE INVENTION

The invention relates to a process for the degreasing, pickling and/or removal of laser scale on ferriferous metal parts, especially by spraying.

The cutting of ferriferous metals by the laser technique is being used increasingly in the sheet fabricating industry. One advantage of the laser cutting technique is its speed, which shortens production times in the sheet-fabricating industry. More and more metal workpieces, especially sheets, are now being cut by laser.

Laser cutting with oxygen as the operating gas produces iron oxide (scale) at the cut edges of the metal. Laser scale is brittle and adheres poorly to the substrate. If sheet metal parts cut to size in this way are lacquered without first removing this scale, the lacquer adheres poorly to these edges, if at all, and easily flakes off. This problem only arises when using the laser cutting technique, since the conventional cutting technique did not normally produce scale at the cut edges of the metal. Before lacquering, such parts only needed to be degreased to ensure adhesion of the lacquer.

Conclusion: The modern and desirable laser cutting technique, in which oxygen has to be used as the operating gas, involves an expensive pretreatment prior to lacquering or powder coating. Examples of suitable pretreatment methods of removing scale are mechanical processes such as sand blasting or dust blasting. However, such mechanical processes are time-consuming and create problems in respect of the dimensional accuracy of the parts.

Another method of removing scale is chemical pickling with acid, where the sheet with scale is dipped in an appropriate bath. This is without problems when using pretreatment plants that work by the dipping process and have an integrated pickling zone. Phosphoric acid pickling baths with ion exchange devices, for example, are known.

The sheet pretreatment is not always carried out by dipping processes. Thus, another pretreatment method that become established along with the dipping process is the spraying process, wherein the parts to be treated are sprayed with the appropriate solutions. The spraying process has the great advantage that the parts can be hung individually on conveyor chains in the appropriate plants. The parts remain hanging on these chains until lacquering has finished. (This is in contrast to the dipping method, where the treatment usually takes place in working baskets and the parts are hung up after the pretreatment and before lacquering.) Processes such as degreasing, degreasing/phosphatizing, phosphatizing [phosphating], etc. are state of the art in the spraying process. The pickling of aluminum in the spraying process is also known and can be controlled by process technology.

However, steel is very rarely pickled and descaled by the spraying process, mainly because the treatment times available in a spraying plant are normally too short for pickling. Another problem is to bring the pickled parts through the rinsing zones to the next treatment stage without them rusting again. After taking up only a few grams of iron, phosphoric acid pickling solutions produce white, sparingly soluble residues of iron (III) phosphate in particular, which can encrust the plant. In the following rinsing bath, as a result of the normal entrainment of product from zone to zone, uncontrollable and usually unwanted iron phosphatizing additionally takes place which, for example, prevents the application of zinc phosphatizing. A spraying pickle based on phosphoric acid is therefore less suitable for the pickling and descaling of ferriferous metals. Loading of the effluent with phosphate is also undesirable.

Sulfuric acid, which is used for pickling aluminum in the spraying process, can hardly be used for steel because of the sensitivity to re-rusting in the rinsing process. This is because the spraying atmosphere is extremely corrosive as it contains not only sulfuric acid but also $Fe^{3+}$ as a powerful oxidant, so even some special steel alloys can be attacked under certain conditions. Concrete is also fiercely attacked by water containing sulfuric acid. All the parts of the plant should therefore be made of a material that is resistant to these particularly corrosive solutions, which alone incurs a barely justifiable cost. In addition, phosphoric and sulfuric acid salts cause effluent problems and are undesirable. Also, concrete is fiercely attacked by effluents containing sulfate.

Sheets produced by the laser cutting technique, especially when the operating gas for laser processing contains oxygen, cannot be treated with phosphoric acid or sulfuric acid in the spraying process because of the problems described.

OBJECT AND SUMMARY OF THE INVENTION

The object of the invention is to overcome the disadvantages of the state of the art and to provide a process by which laser scale present on ferriferous metal surfaces, especially steel parts such as sheets or plates, and/or other contaminants, especially oxidic contaminants, can be removed with relative ease.

The object is achieved by a process for the degreasing, pickling and/or removal of laser scale on surfaces of ferriferous metal parts which is characterized in that the ferriferous surfaces of metal parts to which laser scale may be adhering are treated with an aqueous solution (pickling solution and/or degreasing solution) containing at least one carboxylic acid which is highly water-soluble and complexes Fe ions, at least one salt of at least one carboxylic acid which acts in such a manner, and at least one fatty amine ethoxylate, wherein the solution is buffered, where Fe ions enter the solution and are at least partially complexed, wherein the pH of the pickling solution is higher than that of at least one of the carboxylic acids present, and wherein the total concentration of carboxylic acids and carboxylic acid salts for pickling is 2 to 20 wt. %.

Hereafter the removal of laser scale is also described as a variant of degreasing and/or pickling and is included in these descriptions.

DETAILED DESCRIPTION

Preferably, the total concentration of carboxylic acids and carboxylic acid salts for pickling is in the range from 2.5 to 18 wt. %, 5 to 20 wt. %, 7 to 15 wt. % or 2 to 12 wt. %.

The pH, especially for pickling, ranges preferably from 2.5 to 4.0 or from 2.5 to 3.5 and particularly preferably from 2.8 to 3.2, especially when citric acid and citrate are used.

It is preferable to use a buffered solution in which at least one of the carboxylic acids is partially neutralized or neutralized, especially in which all the carboxylic acids are partially neutralized or neutralized. Preferably, at least one sodium and/or potassium compound is added for buffering, although many types of compounds that allow suitable buffering via appropriate cations are known in principle, an example being amine compounds, such as an alkanolamine, which form ammonium ions. In particular, however, sodium and/or potassium salts of the carboxylic acid(s) are used for this purpose. The solution according to the invention preferably contains only carboxylic acid salts which are present as carboxylic acids in this solution. Particularly preferably, the solution according to the invention essentially contains only one carboxylic acid, which is a hydroxycarboxylic acid. In this case, particularly preferably, the at least one carboxylic acid salt is at least one salt of this hydroxycarboxylic acid. The solution preferably contains hydroxycarboxylic acid(s) and salt(s) of hydroxycarboxylic acid(s), especially citric acid and citrate(s), in a total amount ranging from 0.1 to 20 wt. % for degreasing or in a total amount ranging from 2 to 20 wt. % for pickling.

Preferably, the carboxylic acid of the solution according to the invention is a hydroxycarboxylic acid and/or the carboxylic acid salt is a hydroxycarboxylic acid salt. Particularly preferably, all the carboxylic acids of the solution according to the invention are hydroxycarboxylic acids and all the carboxylic acid salts are hydroxy-carboxylic acid salts. Advantageously, the solution (pickling solution and/or degreasing solution) contains citric acid and/or at least one of its salts. Preferably at least 50 wt. % and particularly preferably at least 75 wt. % of the carboxylic acids or carboxylic acid salts is made up of citric acid or citrates. Preferably, the total concentration of citric acid and citrates in the solution is 2.5 to 15 wt. %.

Fatty amine ethoxylates have proved outstanding as surfactants for this purpose because they allow a particularly uniform wetting of the metal surface and thereby keep the acid away from the metal surface. They have cationic or non-ionic surfactant properties, depending on chain length. Particularly preferably, the fatty amine ethoxylates used are coconut fatty amine ethoxylates. The amount of fatty amine ethoxylates added to the solution according to the invention preferably ranges from 0.05 to 0.5 wt. % (degreasing solution and/or pickling solution), but, in the presence of at least one other surfactant, it can also be at least 0.005 wt. % for degreasing. The amount is thus very high in many cases. The unusually high content of surfactants in the pickling solution helps to suppress rust formation on the metal surface after pickling. In principle, the at least one other surfactant optionally used together with the at least one fatty amine ethoxylate can be any commercially available surfactant, provided that it has a zero, very low or well controllable foaming action and/or even a defoaming action. In principle, however, the addition of a fatty amine ethoxylate to the degreasing solution can also be completely omitted if at least one other suitable surfactant is added. If appropriate, this can be ascertained in preliminary experiments. The at least one other surfactant is preferably a cationic surfactant and/or a non-ionic surfactant.

The content of fatty amine ethoxylates in the solutions according to the invention (degreasing and/or pickling solutions) is preferably at least 50 wt. % of the total content of all the surfactants, preferably at least 70 or at least 90 wt. % and optionally almost or exactly 100 wt. %.

Preferably, the aqueous solution according to the invention (pickling solution/degreasing solution), used as a bath solution, consists essentially of at least one carboxylic acid which is highly water-soluble and complexes Fe ions, at least one salt of at least one carboxylic acid which acts in such a manner, e.g. a hydroxycarboxylic acid or salt thereof, especially citric acid or citrate, at least one fatty amine ethoxylate and at least one substance for buffering the chemical system (the solution), e.g. at least one type of cation selected especially from ammonium ions and at least one type of alkali metal ion such as sodium and/or potassium ions, and optionally at least one other surfactant, at least one complexing agent for avoiding coloured films, e.g. a compound based on nitrilotriacetic acid, at least one pickling inhibitor based e.g. on thio-urea derivatives, at least one fluoride in amounts of up to about 0.01 wt. %, at least one complex fluoride up to about 0.01 wt. %, and/or at least one other additive. Buffering can be effected here by adding at least one nitrogen-containing compound that forms ammonium ions, e.g. at least one amine and especially at least one monoamine or triamine. At least one sodium and/or potassium compound is particularly preferred as the at least one substance to be added for buffering. The at least one buffering substance can optionally also be used to adjust the pH. The content of the at least one buffering substance in the solution according to the invention is frequently in the range from 0.05 to 8 wt. % and preferably in the range from 0.5 to 6 wt. %.

In principle, suitable carboxylic acids or salts thereof are any carboxylic acids or any carboxylic acid salts that have a high water solubility (at least 50 g/l of water at room temperature, preferably at least 120 or at least 180 g/l and particularly preferably at least 250 g/l) and a powerful complexing action for Fe ions. These can be e.g. mono-, di-, tri- and/or polycarboxylic acids, mono-, di-, tri- and/or polyhydroxycarboxylic acids and derivatives thereof. Particularly preferred carboxylic acids and salts thereof are those which precipitate Fe ions well, for which the precipitation products can be filtered off easily, and which have environmentally friendly compounds, especially hydroxycarboxylic acids and salts thereof and specifically citric acid and citrates. Examples of other preferred carboxylic acids are malic acid, succinic acid, gluconic acid, glycolic acid, malonic acid, lactic acid and/or tartaric acid. Examples of other preferred salts are those of malic acid, succinic acid, gluconic acid, glycolic acid, malonic acid, lactic acid and/or tartaric acid. Particularly preferably, the carboxylic acids or salts are at least partially made up of citric acid or citrates.

Buffering is essential in the solution according to the invention and effects partial neutralization or neutralization of at least one carboxylic acid and salt formation.

Buffering of the carboxylic acid(s)—particularly citric acid—in the pickling solution or in an acidic degreasing solution, especially to pH values ranging from 2.5 to 4.0 or 2.5 to 3.5, makes it possible to establish a comparatively narrow and slightly higher pH range that represents a very good and safe working range. Citrate can be formed in this way. Unbuffered, more highly concentrated citric acid solution has a pH of about 2.0.

The pH can advantageously be adjusted by adding sodium- and/or potassium-hydroxide solution.

However, ammonium ions, which may also be released via the amine compound, can cause quite a strong odor above pH 3.5, so sodium and/or potassium are preferred. In principle, the amine compound used can be any type of amine compound suitable for buffering, especially a mono-, di- and/or triamine such as monoethanolamine.

The addition of at least one other complexing agent based e.g. on nitrilotriacetic acid, NTA, especially at least one particularly powerful complexing agent, can help to avoid or remove any coloured films formed. It can also help to make the carboxylic acid salt complex even more stable. This additional complexing agent can be present in the degreasing solution and/or pickling solution in an amount ranging especially from 0.01 to 5 wt. %.

It is not normally necessary to add a pickling inhibitor to the pickling solution, but in rare cases there may be special circumstances where such an addition is helpful.

The addition of a fluoride and/or a complex fluoride to the pickling solution, in amounts of up to about 0.01 wt. % in each case, may help to accelerate the pickling in some instances.

The addition of at least one organic solvent and/or at least one additive, e.g. a biocide, an emulsifier, an emulsion breaker, a defoamer, an odor improver, a solubilizer and/or an oxidant, may be desirable in some cases. Where possible, however, the amounts of organic solvents in the degreasing solution should be limited to contents of up to 0.1 wt. % of all types of organic solvents, and the amounts of each additive should usually be limited to contents of up to about 0.01 wt. % or up to 0.1 wt. %. It is particularly preferable to keep the solution free or substantially free of organic solvents and/or enzymes.

Preferably, in addition to at least one type of cation (compound) for buffering the chemical system, the solution according to the invention also contains at least one other compound selected from the group comprising other complexing agents, pickling inhibitors, fluorides, complex fluorides, organic solvents, biocides, emulsifiers, emulsion breakers, defoamers, odor improvers, solubilizers and oxidants.

Furthermore, a very wide variety of substances could be added to the aqueous solution, examples being at least one organic solvent such as an alcohol, at least one oil and/or at least one other additive. However, preliminary experiments have shown that, in contrast to many other mixtures of substances in surface technology, such additives are not necessary or may even cause interference. Therefore, as just mentioned, the addition of other substances of these types is not preferred or is even to be totally avoided or minimized, e.g. if such substances are entrained. Despite its simplicity, the chemical system according to the invention has proved extremely effective.

Preferably, the solution according to the invention consists only or substantially only of the above-mentioned groups of compounds.

Furthermore, the solutions according to the invention are preferably extensively or completely free of phosphoric acid, hydrochloric acid and sulfuric acid.

The degreasing temperatures range preferably from 10 to 90° C., particularly preferably from 25 to 70° C. and very particularly preferably from 40 to 60° C. The pickling temperatures range preferably from 10 to 80° C., particularly preferably from 25 to 70° C. and very particularly preferably from 30 to 65° C. However, if the chosen pickling temperature is too high, rusting and/or spotting can occur in the acidic water vapor atmosphere.

In one preferred embodiment of the invention, the ferriferous metal parts are made of steel. In particular, these steels are a very wide variety of conventional steel alloys, but it would also be possible to treat a special steel alloy. In this case, however, it is usually undesirable for the metal surface to be provided with a passive layer, which is often recognizable by a coloured film.

The parts treated according to the invention can be e.g. coils, sheets, sheet blanks, bright steel parts, black steel parts, structural shapes and/or lasered sheets, it being possible in principle for any types of steel parts to be treated by the process according to the invention.

In principle, the treatment of the metal surfaces with the aqueous solution according to the invention can take place in one or more stages.

In a one-stage process, it is preferable to choose conditions that are otherwise indicated for the pickling process or the pickling solution, e.g. a pH ranging from 2.5 to 4.

In a multi-stage process, degreasing (precleaning) can be carried out in a first treatment stage or in first and second treatment stages, at least one pickling operation being carried out in at least one subsequent treatment stage. The transitions between degreasing/cleaning and pickling are continuous. These processes often run concurrently. Between the degreasing stage(s) and the at least one pickling stage, it is possible to provide at least one stage for rinsing with water. Surprisingly, however, it has been found that this intermediate rinse (these intermediate rinses) can be omitted, thereby making it possible to design the treatment plant shorter than usual and lower the treatment costs.

Degreasing is preferably carried out with an aqueous solution which contains hydroxycarboxylic acid and alkali metal salt(s) of hydroxycarboxylic acid and at least one surfactant (this composition optionally being similar to that of the pickling solution to be used thereafter), the pH of the solution often ranging preferably from 6 to 10 and particularly preferably from 7 to 10, and the total concentration of carboxylic acid(s), especially hydroxycarboxylic acid(s), and alkali metal salt(s) of carboxylic acid(s), especially hydroxycarboxylic acid(s), ranging especially from 0.1 to 1 wt. % and particularly preferably from 0.2 to 0.5 wt. %.

In a degreasing operation in which the solution according to the invention has a predominantly or uniquely degreasing action, the aqueous solutions contain preferably carboxylic acid(s) and carboxylic acid salt(s), particularly preferably hydroxycarboxylic acid(s) and hydroxycarboxylic acid salt(s), and especially citric acid and citrate(s), in total amounts ranging from 0.1 to 20 wt. %, preferably from 5 to 20 wt. %, 2 to 12 wt. %, 1 to 8 wt. %, 0.5 to 6 wt. % or 0.2 to 5 wt. %, and surfactants, including fatty amine ethoxylates, in amounts ranging from 0.005 to 0.5 wt. % and preferably from 0.01 to 0.4 wt. % or from 0.05 to 0.3 wt. %. In a mixture of carboxylic acids and carboxylic acid salt(s), the content of citric acid and citrate(s) can range from 0.1 to 19.8 wt. %, preferably from 0.3 to 19 wt. % and particularly preferably from 0.5 to 16 wt. %. In principle, in a degreasing operation, the pH can be varied in the range from about 2.5 to 13.

In a pickling operation in which the solution according to the invention has a predominantly or uniquely pickling action, the aqueous solutions contain preferably carboxylic acid(s) and carboxylic acid salt(s), particularly preferably hydroxycarboxylic acid(s) and hydroxycarboxylic acid salt(s), and especially citric acid and citrate(s), in total amounts ranging from 2 to 20 wt. %, preferably from 7 to 14 wt. % or from 2.5 to 15 wt. %, and surfactants, including fatty amine ethoxylates, in amounts ranging from 0.05 to 0.5 wt. % and preferably from 0.1 to 0.4 wt. %. A total content of citric acid and citrates ranging from 8 to 12 wt. % has proved outstanding in experiments for the removal of laser scale. In a mixture of carboxylic acids and carboxylic acid salt(s), the content of citric acid and citrate(s) can range from 0.5 to 19.8 wt. %, preferably from 1 to 19 wt. % and particularly preferably from 2 to 16 wt. %. Although it is also often possible in principle to carry out the pickling operation at pH values of up to about 4, markedly higher pH values gave poorer, i.e. spotted, surfaces in the present experiments.

In multi-stage processes carried out without one or more intermediate rinses between degreasing and pickling, it has proved particularly recommendable for the weight ratio of carboxylic acid(s) and carboxylic acid salt(s), especially citric acid and citrate(s), to all the surfactants, including fatty amine ethoxylates, to be in the same, a similar or an only slightly modified order of magnitude in these process stages. This normally enables the corresponding baths to be operated safely and without problems.

In principle, the solutions according to the invention can be applied by any possible method, e.g. by flooding, spraying and/or dipping, spraying being particularly preferred. In the case of dipping and some other methods of application without substantial exposure to atmospheric oxygen, it may be necessary or advantageous in some chemical systems to add at least one oxidant such as hydrogen peroxide.

The pickling can be followed e.g. by rinsing, activation, rinsing, phosphatizing, rinsing, rinsing with demineralized water and/or lacquering, with at least one process stage in each case.

The process can be carried out e.g. in a conventional spray pretreatment plant which is state of the art in surface technology. Such a plant can comprise e.g. the following zones:

spray degreasing I, optional spray degreasing II, rinsing I, optional rinsing II, activation, phosphatizing, rinsing I, optional rinsing II and rinsing with demineralized water.

Alternatively, such a plant can comprise e.g. the following zones:

spray degreasing I, optional spray degreasing II, rinsing and passivation or oiling with an oil emulsion.

Passivation can be effected e.g. with a solution containing amine or silane. Instead of amine passivation, it is also possible to passivate inter alia with silanes, in which case siloxanes and/or polysiloxanes are formed via silanols. Passivation is understood as meaning a firm coating which at least temporarily should protect against rust and at least temporarily is not covered by at least one film of lacquer.

At least the "spray degreasing II" and "rinsing" zones should be made of V2A-grade steel (chromium 18/nickel 8) or even more rust-resistant materials, and the seals should be made of PTFE or Viton®, for example.

The degreasing is preferably carried out under alkaline conditions, especially at a pH ranging from 6 to 10 and preferably from 7 to 9.

It has been found that such a process is suitable for removing laser scale from ferriferous metal parts, especially steel parts, in the normal spraying times and at normal bath temperatures. The treatment of ferriferous metal parts which has been described here allows subsequent phosphatizing, even highly refined tri-cation phosphatizing based on ZnMnNi phosphate, as well as any other type of phosphatizing, including alkaline phosphatizing such as iron phosphatizing. It has also been found that the iron content of the solution stabilizes approximately in the range from 0.5 to 0.6 wt. % of bath solution. At higher contents, the iron that dissolves in the pickling of oxide films or laser scale is precipitated as carboxylic acid salt(s), e.g. iron citrate, and can be filtered off if necessary. Iron citrate, for example, can be filtered off very easily and thoroughly. This affords very stable bath properties over a long period of time.

In some embodiments the ferriferous metal parts are preferably degreased with an aqueous solution before the pickling according to the invention, because oils and fats can have an adverse effect on the action of the cationic surfactant over time. This degreasing can be carried out e.g. in conventional manner with any mildly alkaline or alkaline cleaner, this being followed by rinsing in a rinsing zone.

Particularly preferably, the degreasing is carried out with an aqueous solution which—optionally analogously to the pickling solution—contains at least one carboxylic acid which is highly water-soluble and complexes Fe ions, at least one salt of at least one carboxylic acid which acts in such a manner, and at least one fatty amine ethoxylate. The degreasing solution preferably contains citric acid and at least one citric acid salt, and particularly preferably at least one alkali metal salt of citric acid. In addition, the degreasing solution can also contain at least one other surfactant. The pH of the degreasing solution ranges preferably from 2.5 to 13, particularly preferably from 6 to 10 and very particularly preferably from 7 to 9. The total concentration of carboxylic acids and salts which act in such a manner is preferably 0.5 to 15 wt. %. The oils and fats entering the solution during the degreasing stage are preferably removed by means of an oil separator. Preferably, the aqueous solution according to the invention is present as a buffering and/or buffered and complexing and/or complexed system, especially for pickling.

This has the advantage that solutions of a similar formulation can be used for degreasing and pickling, and that a rinsing process between degreasing and pickling is then usually superfluous.

The process according to the invention can be carried out inter alia in the known and often already existing spray pretreatment plants. Laser-cut ferriferous metal parts, inter alia, can thus be pretreated in a simple manner ready for lacquering.

Flash rusting was prevented by the process according to the invention, which often requires only about 2 minutes for degreasing, often only about 4 to 6 minutes for the removal of laser scale and often only about 4 to 10 minutes for degreasing and/or pickling. Other surface impurities, e.g. graphite, and other particulate contaminants, e.g. scuff, lapping abrasives and/or burnishing compounds, can also be removed by this process.

The slurry formed in the preliminary experiments was very fine, loose and easy to remove by filtration. As a slurry based on iron citrate, it could even be used as fertilizer if it was kept sufficiently clean, e.g. free of oil and free of heavy metals other than iron. Up to 100% of the surfactants can optionally be removed from the aqueous solution.

It was surprising that a very powerful degreasing and pickling action could be achieved with the solutions according to the invention, in a comparatively very simple and cost-effective manner, using a safe process that could be made very environmentally friendly. The bath proved to be exceptionally stable and could be used for a very long time without the need to replenish many chemicals. If the process is set up appropriately, it is possible to obtain environmentally friendly slurries which can be put to further use in nature. The water consumption could be markedly reduced. The metal surfaces, especially steel surfaces, treated in this way were of outstanding quality. Even a black bath containing a greater concentration of iron ions afforded degreasing and pickling results of unusually high quality.

The subject of the invention is illustrated in greater detail with the aid of the following Examples:

EXAMPLE 1

Removal of Laser Scale on a Steel Part, with Subsequent Phosphatizing

A laser-cut component for agricultural equipment, made of 6-mm-thick steel plate, was treated in the spraying process for 3 minutes at approx. 50° C. with a degreasing solution prepared by mixing 81.70 parts by weight of water, 10.00 parts by weight of citric acid, 6.25 parts by weight of sodium hydroxide, 2.00 parts by weight of NTA sodium salt (sodium salt of nitrilotriacetic acid) and 0.05 part by weight of laurylamine ethoxylate, and then diluting 2 parts by weight of this solution with 98 parts by weight of water.

The steel part was then treated in the spraying process for 4 minutes at approx. 60° C. with a pickling solution prepared by mixing 41.3 parts by weight of water, 40.0 parts by weight of citric acid, 17.7 parts by weight of 30% potassium hydroxide solution, 0.7 part by weight of laurylamine ethoxylate and 0.3 part by weight of fatty alcohol (ethoxylated/propoxylated), and then diluting 10 parts by weight of this solution with 90 parts by weight of water.

This was followed by process steps conventionally used in surface treatment, such as rinsing with tap water, activation with titanium phosphate, zinc phosphatizing, rinsing, and rinsing with demineralized water. If citric acid or citrate was entrained into the phosphatizing bath, this had a positive effect on the zinc phosphatizing by reducing the size of the phosphate crystals.

EXAMPLE 2

Removal of Laser Scale on a Steel Part, with Subsequent Passivation

Several laser-cut components for agricultural equipment, made of 6-mm-thick steel plate, were degreased and pickled analogously to Example 1 and rinsed with tap water. The steel parts were then passivated with amine in known manner, the aqueous solution containing a different amine in each case. The passivation with one amine in each case could be carried out successfully using any type of amine, e.g. at least one mono-, di-, tri- and/or polyamine, including dimethylethanolamine, monoethanolamine and triethanolamine, inter alia.

It is claimed:

1. A process for removing laser scale on a surface of a ferriferous metal part having laser scale thereon by treating the surface of the ferriferous metal part with an aqueous pickling solution comprising:

at least one carboxylic acid which is water-soluble and complexes Fe ions from said metal part;

at least one salt of at least one carboxylic acid which is water soluble and complexes said Fe ions;

at least one fatty amine ethoxylate;

wherein the aqueous pickling solution is buffered;

wherein said Fe ions enter the aqueous pickling solution and are at least partially complexed;

wherein the pH of the aqueous pickling solution is higher than that of said at least one carboxylic acid present;

wherein the total concentration of the carboxylic acid and the carboxylic acid salt for pickling is from 2 to 20 wt. %; and wherein the laser scale on the surface of the ferriferous metal part is removed.

2. A process according to claim 1, wherein the at least one carboxylic acid or salt thereof is a hydroxycarboxylic acid or a salt of a hydroxycarboxylic acid.

3. A process according to claim 1, wherein the fatty amine ethoxylate comprises a coconut fatty amine ethoxylate.

4. A process according to claim 1, wherein the fatty amine ethoxylate is added to the aqueous pickling solution in an amount of from 0.05 to 0.5 wt. %.

5. A process according to claim 1, wherein the aqueous pickling solution comprises at least one compound selected from the group consisting of a complexing agent, a pickling inhibitor, a fluoride, an organic solvent, a biocide, an emulsifier, a defoamer, an odor improver, a solubilizer and an oxidant.

6. A process according to claim 1, wherein the ferriferous metal part is degreased prior to treatment with the aqueous pickling solution.

7. A process according to claim 1, wherein the pH of the aqueous pickling solution ranges from 2.5 to 4.0.

8. A process according to claim 1, wherein the process is carried out in a spray pretreatment plant.

9. A process according to claim 6, wherein the degreasing is conducted with an aqueous degreasing solution comprising a hydroxycarboxylic acid and a salt of a hydroxycarboxylic acid and at least one surfactant, and the aqueous degreasing solution has a pH of ranging from 6 to 10, and the total concentration of said hydroxycarboxylic acid and said salt of a hydroxycarboxylic acid is from 0.1 to 20 wt. %.

* * * * *